United States Patent
Prajapat

(10) Patent No.: US 10,735,490 B2
(45) Date of Patent: Aug. 4, 2020

(54) DEVICES AND SYSTEMS FOR VOICE OVER INTERNET PROTOCOL FOR IDENTIFYING NETWORK TRAFFIC

(71) Applicant: Edgewater Networks, Inc., San Jose, CA (US)

(72) Inventor: Surendra Prajapat, Cupertino, CA (US)

(73) Assignee: Edgewater Networks, Inc., San Jose, CA (US)

(*) Notice: Subject to any disclaimer, the term of this patent is extended or adjusted under 35 U.S.C. 154(b) by 0 days.

(21) Appl. No.: 16/008,668

(22) Filed: Jun. 14, 2018

(65) Prior Publication Data
US 2019/0387042 A1    Dec. 19, 2019

(51) Int. Cl.
*H04L 29/06*    (2006.01)
*G06N 20/00*    (2019.01)

(52) U.S. Cl.
CPC ............ *H04L 65/80* (2013.01); *G06N 20/00* (2019.01); *H04L 65/40* (2013.01)

(58) Field of Classification Search
CPC .......... H04L 65/80; H04L 65/40; G06N 20/00
See application file for complete search history.

(56) References Cited

U.S. PATENT DOCUMENTS

| | | | |
|---|---|---|---|
| 2014/0372349 A1* | 12/2014 | Driscoll | G06N 5/04 706/12 |
| 2017/0374089 A1* | 12/2017 | Anderson | H04L 63/1425 |
| 2018/0198838 A1* | 7/2018 | Murgia | H04L 65/80 |
| 2018/0287903 A1* | 10/2018 | Joshi | H04L 67/10 |
| 2018/0367626 A1* | 12/2018 | Azout | H04L 67/26 |

* cited by examiner

*Primary Examiner* — Siming Liu
(74) *Attorney, Agent, or Firm* — Brooks, Cameron & Huebsch, PLLC

(57) ABSTRACT

Devices and systems for voice over Internet protocol (VoIP) for identifying network traffic are described herein. One or more embodiments include a VoIP device for identifying network traffic comprising a signal monitor to identify a signaling protocol from the network traffic and an artificial intelligence engine configured to receive signaling protocol sample data to train a signal artificial intelligence (AI) model and process the signaling protocol identified by the signal monitor in the signal AI model to identify the network traffic.

20 Claims, 2 Drawing Sheets

DEVICES AND SYSTEMS FOR VOICE OVER INTERNET PROTOCOL FOR IDENTIFYING NETWORK TRAFFIC

TECHNICAL FIELD

The present disclosure relates to devices and systems for voice over Internet protocol for identifying network traffic.

BACKGROUND

Many organizations use a voice over Internet protocol (VoIP) communication system to communicate rather than a traditional telephone communication system. As with all communication systems, the ability to connect the parties wanting to speak to each other over a VoIP system and to maintain that connection, during their intended communication period, is important. One key to connecting and maintaining that connection are identifying network traffic to provide a better quality of service (QoS).

Some systems provide varying QoS, for example, based on the type of network traffic being communicated on the VoIP system. In some examples, better QoS can be provided to media traffic over non-media traffic. Media traffic can include transmitting audio and video data. In some such systems, the QoS determination can be used to control factors, such as bandwidth, transmission delays, jitter, and/or packet loss, that can impact performance of the network traffic.

VoIP communication resources can be underutilized when a QoS is randomly provided to network. For example, non-media network traffic is not as sensitive as media network traffic to transmission delays, jitters, and packet loss. As described above, transmission delays, jitters, and packet loss can be minimized by providing the network traffic with an increased QoS. In some examples, non-media network traffic could be provided a higher QoS than media network traffic, wasting VoIP communication resources that could be used to minimize transmission delays, jitters, and packet loss for media network traffic.

DETAILED DESCRIPTION

Figure 1:
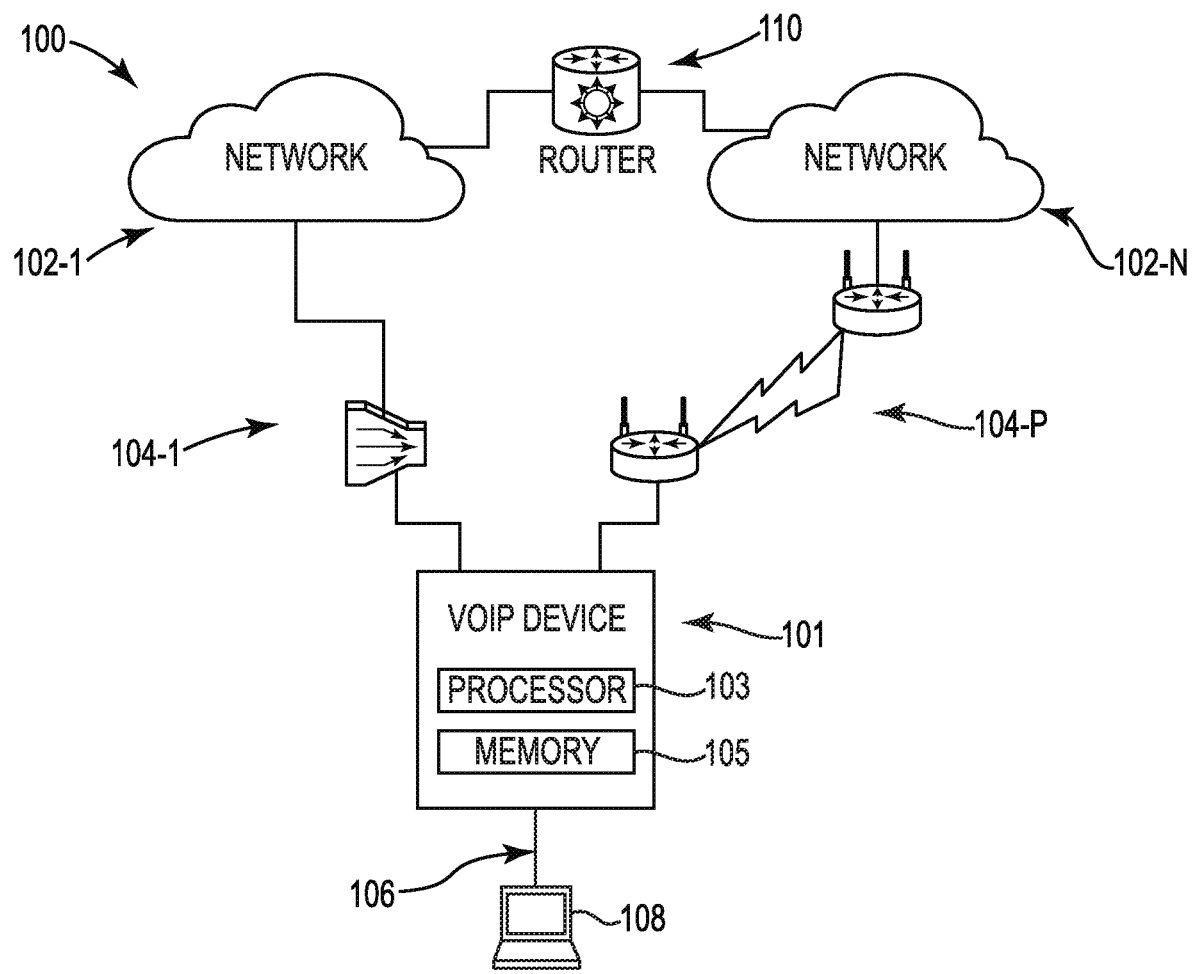
FIG. 1 illustrates an example of a system including voice over Internet protocol (VoIP) devices according to one or more embodiments of the present disclosure.

In the embodiments of the present disclosure, an edge device and/or other voice over internet protocol (VoIP) device can be included in a communication system. The communication system can also include a number of networks that can be connected to the VoIP device. The number of networks can be used by a party using an end device to communicate with another party, via network traffic, through an intermediary device.

The VoIP device can be used for identifying network traffic. The device can include a signal monitor to identify a signaling protocol from the network traffic.

In some examples, the device can also include an artificial intelligence engine. The artificial intelligence engine can be configured to receive signal protocol sample data to train a signal artificial intelligence (AI) model and process the signaling protocol identified by the signal monitor in the signal AI model to identify the types of information being passed in packets within the network traffic.

The signal protocol sample data can include a plurality of randomly selected signal protocol bit patterns, for example. Training of the signal AI model is complete in response to the signal AI model receiving a lowest error and highest probability in identifying the plurality of randomly selected signal protocol bit patterns.

In some embodiments, the media AI model may be used when the improvement made during training improves less than a minimum threshold value in either the error rate or the probability. In some examples, the signal AI model can be retrained in response to receiving new signal protocol data.

In some embodiments, the signal AI model can include using a logistic regression machine. This logistic regression machine can be numerical computation logic running on hardware that supports mathematical functions, for example. The types of packets in the network traffic can be identified based on a bit pattern of the signal protocol. For example, the bit pattern can include a payload. The payload can be a sequence of bytes that define a bit pattern. In some examples, the payload includes packet data except network transport headers and meta-data.

The signal AI model can, for example, identify the type of packets in the network traffic as media or non-media. Network traffic that is media can, for example, include audio and/or video data. In response to the signal AI identifying the network traffic as media, increased quality of service (QoS) can be provided.

The device can also include a media monitor. The media monitor can identify a media protocol which can be a bit pattern, for example.

As discussed above, in some embodiments, the device can include an artificial intelligence engine. The artificial intelligence engine can be configured to receive media protocol sample data to train a media artificial intelligence (AI) model. For purposes of training the engine, the media protocol sample data can include a plurality of randomly selected media protocol bit patterns, for example.

Training of the media AI model is complete in response to the media AI model receiving a lowest error and highest probability in identifying the plurality of randomly selected media protocol bit patterns as media. In some examples, the media AI model can be retrained in response to receiving new media protocol data.

The media AI model can include using a logistic regression machine. The media AI model can process the media protocol identified by the media monitor to identify network traffic. Network traffic can be identified as media or non-media, for example.

The media AI model can identify the network traffic based on bit pattern of the media protocol. For example, the bit pattern can include a payload. In some examples, the media protocol can be processed by the media AI model in response to the signaling protocol being unavailable. For example, if the signaling protocol is present, the signaling protocol can convey the media network traffic information used to identify the network traffic as media and as a result there is no need to run the media AI model.

In some embodiments, increased quality of service (QoS) can be provided in response to the media AI model identifying the network traffic as media. Voice and video data can be included as media and can be sensitive to delays, jitters, and packet loss, for example. Providing better QoS can minimize these defects for a better user experience.

In some embodiments, a system for identifying network traffic can include a network interface. The network interface can be configured to capture the network traffic and send a payload from the network traffic to a signal AI engine within the system to determine what level of QoS the network traffic should receive. The signal AI engine can be configured to receive the payload and identify the network traffic based on learning the signal AI model from known media network traffic patterns.

The system can also include a media AI engine. The media AI engine can be configured to receive the payload and identify the type of network traffic in response to the signal AI engine failing. As described above, the media AI engine can be used as a backup for the signal AI engine.

In some embodiments, the media AI engine can be further configured to extract Internet protocol (IP) and/or port information. The IP and/or port information can be sent to a QoS enforcer. A QoS enforcer can be a system of queues associated with an interface connected to a link, where each queue can have priority attached. A high priority queue can be chosen first for sending a packet to a link and a low priority queue can be chosen last for sending a packet to a link, for example.

The signal AI engine and/or the media AI engine can calculate a probability that the type of network traffic was identified correctly. The network traffic packet type can be identified as media in response to the probability value exceeding a threshold. The network traffic packet type can be identified as non-media in response to the probability failing to exceed a threshold. In response to identifying the network traffic packet type, the bandwidth provided can be increased or decreased in an attempt to better accommodate the media type.

In this manner, the QoS of the system can be adjusted more precisely, based on the information obtained about the types of packets that are being moved in the network traffic. This can make the network communications of the system more efficient, which can reduce monetary and/or equipment usage costs, among other benefits.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of operations" can refer to one or more operations.

FIG. 1 illustrates an example of a system including voice over Internet protocol (VoIP) devices according to one or more embodiments of the present disclosure. In the embodiment illustrated in FIG. 1, the system 100 includes a number of VoIP devices 101, a number of networks 102-1, 102-N (e.g., WAN networks), a number of network links 104-1, 104-P (wired or wireless), a number of local networks 106, a number of end communication devices that a party may use to communicate with another party over a connection through one of the network links 104-1, 104-P, and a number of intermediary devices 110 that provide a pathway to allow the passing of packets between networks 102-1, 102-N.

The system 100, shown in FIG. 1, includes two network connections (via networks 102-1 and 102-N) that can be used by a party using the end device 108 to communicate with another party on a network that is communicating through intermediary device 110. In this manner, a communication session can be created between two parties, allowing them to communicate with each other.

As can be seen from the illustration in FIG. 1, a VoIP device 101 is connected to links to several networks. For instance, link 104-1 allows connection to network 102-1 and a unique IP address is provided to identify the device 101 with respect to that network. Link 104-P allows connection to network 102-N and a unique IP address (different from that used for network 102-1) is provided to identify the VoIP device 101 with respect to that network. Additionally, VoIP device 101 is also connected to a local network (LAN) through link 106 and a unique IP address (different from those used for networks 102-1, 102-N) is provided to identify the device 101 with respect to that network.

In some examples, the VoIP device 101 can include a processor 103 and a memory 105. The memory 105 can have various types of information including data and executable instructions.

The processor 103 can execute instructions that are stored on an internal or external non-transitory computer readable medium (CRM). A non-transitory CRM can include volatile and/or non-volatile memory.

Volatile memory can include memory that depends upon power to store information, such as various types of dynamic random access memory (DRAM), among others. Non-volatile memory can include memory that does not depend upon power to store information.

The memory 105 and/or the processor 103 may be located on the VoIP device 101 or off of the VoIP device 101, in some embodiments. The processor 103 can execute instructions stored on the memory 105 to identify a signaling protocol from the network traffic, receive signaling protocol sample data to train a signal AI model, and process the signaling protocol identified by the signal monitor in the signal artificial AI model to identify the network traffic, for example.

Figure 2:
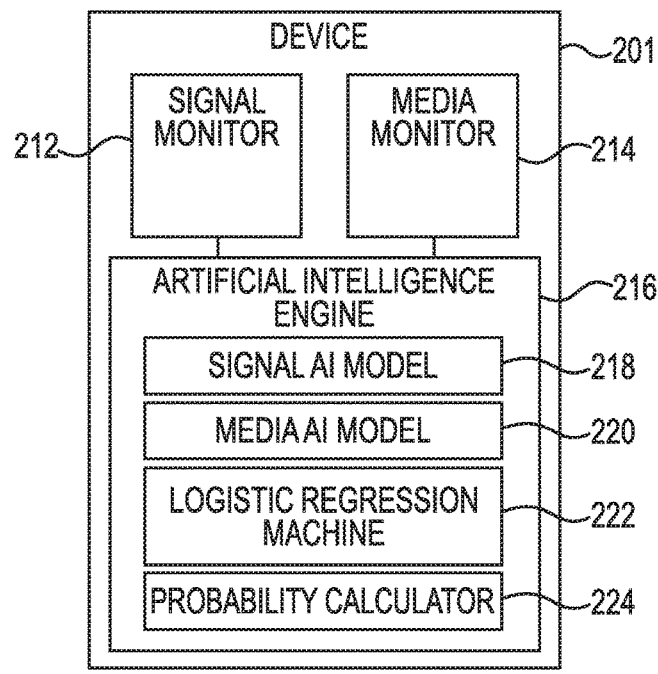
FIG. 2 illustrates an example of a device for identifying network traffic according to one or more embodiments of the present disclosure.

FIG. 2 illustrates an example of a device for identifying network traffic according to one or more embodiments of the present disclosure. The device 201 can be, for example, an edge device (sitting at the edge of a local area network and a wide area network) and/or another type of VoIP device. The device 201 can be a router, for example. The device 201 can be in the path of the network traffic or can receive a sample (a packet or portion thereof) of the network traffic from a different device in the path of the network traffic.

In some examples, the device 201 can include a signal monitor 212, a media monitor 214, and an artificial intelligence engine 216. The signal monitor 212 of the device 201 can capture network packets and can be utilized to identify a signaling protocol from the network traffic. The signaling protocol can be a protocol that defines standards for exchanging communication parameters and media capabilities between two parties, for example.

The artificial intelligence engine 216 can include a signal AI model 218, a media AI model 220, a logistic regression machine 222, and a probability calculator 224. The artificial intelligence engine 216 can be configured to receive signal protocol sample data. The signal protocol sample data can be used to train the signal AI model 218.

The artificial intelligence engine 216 can also process the signaling protocol identified by the signal monitor 212 in the signal AI model 218 to identify the network traffic.

The signal protocol sample data can include a plurality of randomly selected signal protocol bit patterns, for example. Training of the signal AI model 218 is complete in response to the signal AI model 218 receiving a lowest error and highest probability in identifying the plurality of randomly selected signal protocol bit patterns as media. In some examples, the signal AI model 218 can be retrained in response to receiving new signal protocol data.

In some embodiments, the artificial intelligence engine 216 can include a logistic regression machine 222. The signal AI model 218 can use the logistic regression machine 222. The logistic regression machine 222 can estimate the parameters of a logistic model.

For example, the logistic model can estimate the probability of a binary response based on one or more predictor features. A training set is used to create an optimal set of parameters that minimizes error and increases the probability of a particular outcome. For a given set of test input features, if the computed probability is above a certain threshold, the input can be classified as a media type.

Network traffic can be identified based on bit pattern of the signal protocol. For example, the bit pattern can include a sequence of bytes in a payload. The signal AI model 218 can identify the network traffic as media or non-media. Network traffic as media can include audio and/or video data. In response to the signal AI model 218 identifying the network traffic as media, increased quality of service (QoS) can be provided.

The device 201 can include a media monitor 214. The media monitor 214 can identify a media protocol, which can be a bit pattern, for example.

The artificial intelligence engine 216 can include a media artificial intelligence (AI) model 220. The artificial intelligence engine 216 can be configured to receive media protocol sample data to train the media AI model 220. The media protocol sample data can include a plurality of randomly selected media protocol bit patterns, for example.

As discussed above, training of the media AI model 220 is complete in response to the media AI model 220 receiving a lowest error and highest probability in identifying the plurality of randomly selected media protocol bit patterns as media. In some examples, the media AI model 220 can be retrained in response to receiving new media protocol data.

The media AI model 220 can include using the logistic regression machine 222. The logistic regression machine analyzes the one or more randomly selected media protocol bit patterns and identifies them as media or non-media. The results can be reviewed periodically by a human user or a computing device to help precision the accuracy of the determination between media and non-media. As discussed above, if the probability of determining the type of data or just to update the model with new data types, new training data can be introduced to the media AI model 220. In this manner, the media AI model 220 can process the media protocol identified by the media monitor 214 to identify network traffic. Network traffic can be identified as media or non-media, for example.

The media AI model 220 can identify the network traffic based on bit pattern of the media protocol. For example, the bit pattern can include a sequence of bytes in a payload. In some examples, the media protocol can be processed by the media AI model 220 in response to the signaling protocol being unavailable.

In some embodiments, increased quality of service (QoS) can be provided in response to the media AI model 220 identifying the network traffic as media.

Figure 3:
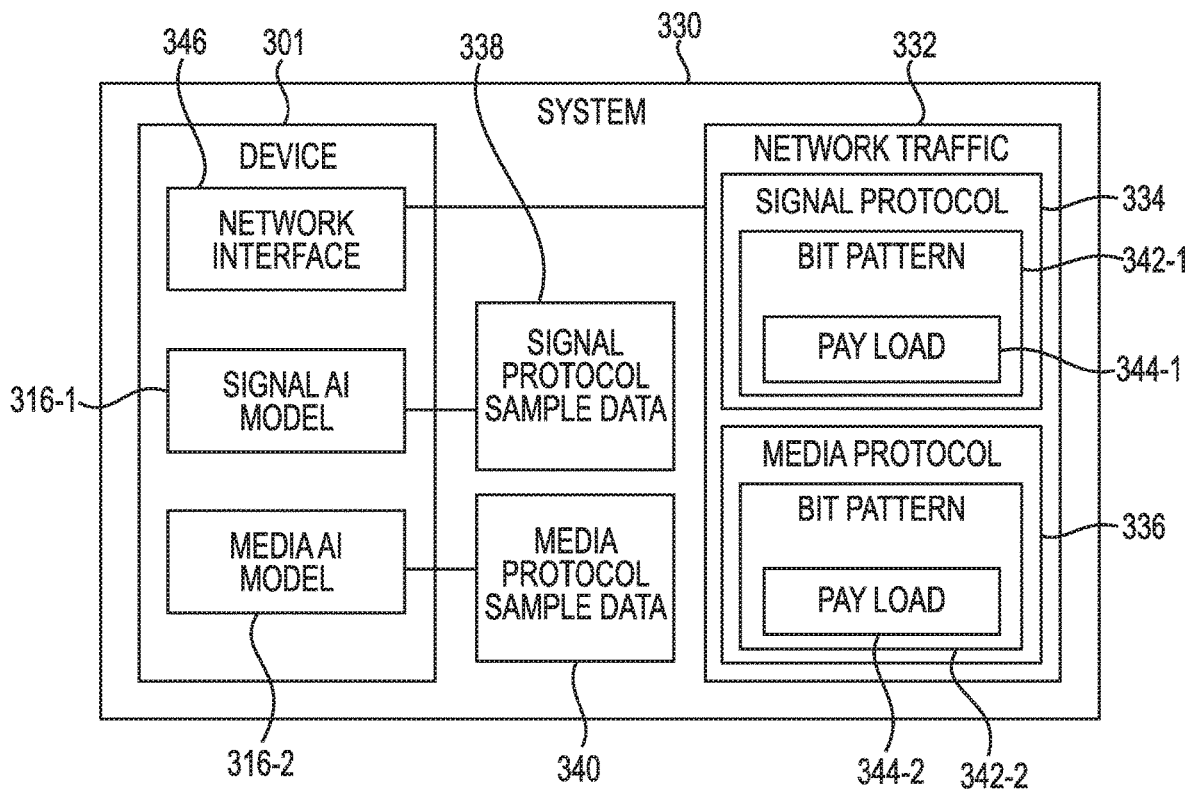
FIG. 3 illustrates an example of a system for identifying network traffic according to one or more embodiments of the present disclosure.

FIG. 3 illustrates an example of a system for identifying network traffic according to one or more embodiments of the present disclosure. The system 330 can include a device 301, signal protocol sample data 338, media protocol sample data 340, and network traffic 332.

The network traffic 332 can include a signal protocol 334 and a media protocol 336. The signal protocol 334 can include a bit pattern 342-1 and the bit pattern 342-1 can include, for example, a payload 344-1. The media protocol 336 can include a bit pattern 342-2 and the bit pattern 342-2 can include, for example, a payload 344-2.

The device 301 can include a network interface 346. The network interface 346 can be configured to capture the network traffic 332 and send the bit pattern 342-1 and/or the payload 344-1 from the network traffic 332 to a signal AI model 316-1.

The device 301 can include a signal AI engine 316-1 configured to receive the bit pattern 342-1 and/or the payload 344-1 and identify the network traffic 332. The device can also include a media AI engine 316-2. The media AI engine 316-2 can be configured to receive the bit pattern 342-2 and/or the payload 344-2 and identify the network traffic 332 in response to the signal AI engine 316-1 failing.

In some embodiments, the media AI engine 316-2 can be further configured to extract IP and/or port information from the network traffic 332. The IP and/or port information can be included in the network traffic 332. The IP and/or port data can be sent to a QoS enforcer, for example. The QoS enforcer can be a system of queues associated with an interface connected to a link, where each queue can have priority attached. A high priority queue can be chosen first for sending a packet to a link and a low priority queue can be chosen last for sending a packet to a link, for example.

The signal AI engine 316-1 and/or the media AI engine 316-2 can calculate a probability that the network traffic 332 was identified correctly. The network traffic 332 can be identified as media in response to the probability exceeding a threshold. The network traffic 332 can be identified as non-media in response to the probability failing to exceed a threshold. In response to identifying the network traffic 332, bandwidth provided is increased or decreased.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A voice over Internet protocol (VoIP) device for identifying network traffic, comprising:
   a media monitor to identify a media protocol from the network traffic;
   a signal monitor to identify a signaling protocol from the network traffic; and
   an artificial intelligence (AI) engine configured to:
      receive signaling protocol sample data to train a signal artificial intelligence (AI) model;
      process the signaling protocol identified by the signal monitor in the signal artificial intelligence (AI) model to identify the network traffic in response to the training of the signal artificial intelligence (AI) model improving at least a minimum threshold value in an error rate or probability in identifying a plurality of randomly selected signal protocol bit patterns;
      receive media protocol sample data to train a media artificial intelligence (AI) model; and
      process the media protocol identified by the media monitor in the media artificial intelligence (AI) model to identify the network traffic in response to the training of the signal artificial intelligence (AI) model improving less than the minimum threshold value in the error rate and probability in identifying the plurality of randomly selected signal protocol bit patterns.

2. The device of claim 1, wherein the signal AI model identifies the network traffic as media or non-media.

3. The device of claim 2, wherein increased quality of service (QoS) is provided in response to the signal AI model identifying the network traffic as media.

4. The device of claim 2, wherein media includes audio or video data.

5. The device of claim 1, wherein the AI engine is configured to process the media protocol identified by the media monitor in response to the signaling protocol being unavailable.

6. An edge device for identifying network traffic, comprising:
   a media monitor to identify a media protocol from the network traffic; and
   an artificial intelligence engine configured to:
      receive media protocol sample data to train a media artificial intelligence (AI) model; and
      process the media protocol identified by the media monitor in the media artificial intelligence (AI) model to identify the network traffic in response to training of a signal artificial intelligence (AI) model improving less than a minimum threshold value in an error rate or probability in identifying a plurality of randomly selected signal protocol bit patterns.

7. The device of claim 6, wherein training the media AI model includes using a logistic regression machine.

8. The device of claim 6, wherein the media AI model identifies the network traffic based on bit pattern of the media protocol.

9. The device of claim 8, wherein the bit pattern can include a payload.

10. The device of claim 6, wherein the media protocol sample data includes a plurality of randomly selected media protocol bit patterns.

11. The device of claim 10, wherein training of the media AI model is complete in response to the media AI model receiving a lowest error and highest probability in identifying the plurality of randomly selected media protocol bit patterns as media.

12. The device of claim 6, wherein the media AI model is retrained in response to receiving new media protocol data.

13. The device of claim 6, wherein the media AI model identifies the network traffic as media or non-media.

14. The device of claim 6, wherein increased quality of service (QoS) is provided in response to the media AI model identifying the network traffic as media.

15. A system for identifying network traffic, comprising:
   a network interface configured to capture the network traffic and send a payload from the network traffic;
   a signal artificial intelligence (AI) engine configured to receive signaling protocol sample data to train a signal artificial intelligence (AI) model, receive the payload, and identify the network traffic; and
   a media artificial intelligence (AI) engine configured to receive the payload and identify the network traffic in response to training of the signal AI model improving less than a minimum threshold value in an error rate or probability in identifying a plurality of randomly selected signal protocol bit patterns.

16. The system of claim 15, wherein the media AI engine is further configured to extract Internet protocol (IP) or port information.

17. The system of claim 16, wherein the network interface is further configured to send the IP or port information to a Quality of Service (QoS) enforcer.

18. The system of claim 15, wherein the signal AI engine calculates a probability that the signal AI engine correctly identified the network traffic.

19. The system of claim 18, wherein the network traffic is identified as media in response to the probability exceeding a threshold.

20. The system of claim 18, wherein the network traffic is identified as non-media in response to the probability failing to exceed a threshold.

* * * * *